United States Patent [19]

Strong

[11] Patent Number: 5,335,340
[45] Date of Patent: Aug. 2, 1994

[54] BYTE-SWAP HARDWARE SIMULATOR FOR A SIXTEEN BIT MICROPROCESSOR COUPLED TO AN EIGHT BIT PERIPHERAL UNIT

[75] Inventor: Michael D. Strong, Mechanicsburg, Pa.

[73] Assignee: The Whitaker Corporation, Wilmington, Del.

[21] Appl. No.: 891,310

[22] Filed: May 29, 1992

[51] Int. Cl.⁵ .............................................. G06F 13/00
[52] U.S. Cl. ........................... 395/500; 395/325; 364/240.3; 364/254.9; 364/255.1
[58] Field of Search ......................... 395/325, 500, 775

[56] References Cited

U.S. PATENT DOCUMENTS

| | | | |
|---|---|---|---|
| 4,374,416 | 2/1983 | Catiller et al. ................. | 395/775 |
| 4,447,878 | 5/1984 | Kinnie et al. .................. | 395/325 |
| 4,716,527 | 12/1987 | Graciotti ....................... | 395/500 |
| 4,831,514 | 5/1989 | Turlakov et al. ............... | 395/500 |
| 5,243,701 | 9/1993 | Muramatsu et al. ............. | 395/325 |

OTHER PUBLICATIONS

"i486 Microprocessor Hardware Reference Manual" pp. 7-3-7-8, 1990 Intel. Corp.
"MC68030 User's Manual" pp. 7-5 to 7-11 1989, Motorola Inc.

*Primary Examiner*—Parshotam S. Lall
*Assistant Examiner*—B. Ledell

[57] ABSTRACT

An arrangement for enabling a sixteen bit microprocessor to transfer data to and from a peripheral unit operating in an eight bit mode includes a single OR gate for simulating an odd address so that only the low byte portion of the data bus is utilized. A subroutine in the microprocessor causes the microprocessor to act as if all addresses in the peripheral unit are even and to force the OR gate to an active state whenever the real address in the peripheral unit is odd.

5 Claims, 7 Drawing Sheets

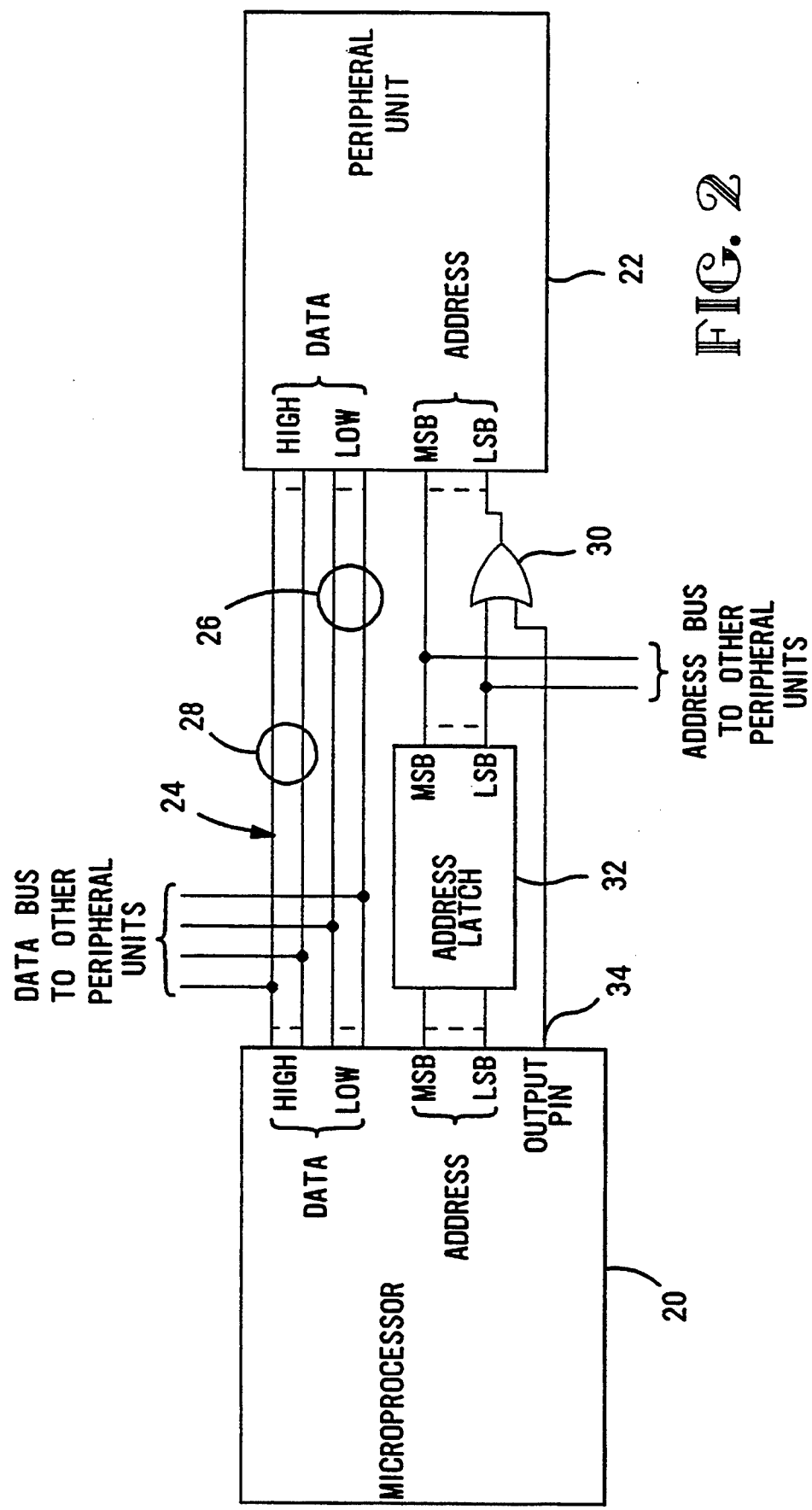

BYTE-SWAP HARDWARE SIMULATOR FOR A SIXTEEN BIT MICROPROCESSOR COUPLED TO AN EIGHT BIT PERIPHERAL UNIT

BACKGROUND OF THE INVENTION

This invention relates to the transfer of data between a microprocessor and a peripheral unit connected thereto and, more particularly, to such a transfer when the microprocessor operates as a sixteen bit microprocessor and the peripheral unit operates in an eight bit mode.

Typically, a microprocessor is connected to a plurality of peripheral units via an address bus and a data bus. The peripheral units may be memory devices, display units, printers, or the like. While it is conventional to divide data into eight bit bytes, many microprocessors operate in a sixteen bit mode, where two eight bit data bytes are processed simultaneously. However, there are peripheral units that are only capable of processing a single eight bit byte of data. Also, some peripheral units, while capable of operating in a sixteen bit mode, may sometimes operate in an eight bit mode, for example, during initialization.

The sixteen bit data bus over which data is transferred between the microprocessor and the peripheral units is divided into a low eight bit byte portion and a high eight bit byte portion. When transferring data over the data bus, the data on the low eight bit byte portion is always considered to have an even address and the data on the high eight bit byte portion is always considered to have an odd address. However, a peripheral unit operating in an eight bit mode only recognizes the low eight bit byte portion of the data bus. Therefore, when a sixteen bit microprocessor transfers data to and from a peripheral unit operating in an eight bit mode, the microprocessor can only use even addresses so that the data is placed on the low eight bit byte portion of the data bus. It is apparent that such operation is unsatisfactory in that odd addresses could never be used and therefore the full capacity of the peripheral unit could not be realized.

In order to allow a sixteen bit microprocessor to satisfactorily transfer data between it and a peripheral unit operating in an eight bit mode, computer manufacturers have developed what is termed "byte-swap" hardware. There are two reasons why such byte swapping is necessary. First, if the sixteen bit microprocessor attempts to perform a sixteen bit access to or from an eight bit peripheral unit, the hardware must break the single access into two separate eight bit accesses, the first to the byte address corresponding to the word address of the access and the second to the next byte address. Secondly, an access to an odd byte address, whether it is a single eight bit access or half of a sixteen bit access broken into two eight bit accesses, must shift the data from the high byte portion of the data bus to the low byte portion of the data bus in the case of a write, or from the low byte portion of the data bus to the high byte portion of the data bus in the case of a read. This shift is necessary because the sixteen bit microprocessor transmits and receives data at odd addresses over the high byte portion of the data bus, while eight bit peripheral units contain only the low byte portion of the data bus. Without this shift, the odd address byte of data would be lost.

As can be imagined, the necessary byte-swap hardware is complex and expensive. It is therefore a primary object of the present invention to provide an arrangement whereby a sixteen bit microprocessor can perform the aforedescribed byte-swapping without the necessity for expensive and complex hardware.

SUMMARY OF THE INVENTION

The foregoing, and additional, objects of the present invention are attained in accordance with the principles of this invention by providing the sixteen bit microprocessor with a software subroutine which simulates the operation of the byte-swap hardware.

In accordance with an aspect of this invention, the only additional hardware necessary is a single OR gate.

BRIEF DESCRIPTION OF THE DRAWINGS

The foregoing will be more readily apparent upon reading the following description in conjunction with the drawing wherein:

FIG. 2 is a block diagram showing how a sixteen bit microprocessor is connected to a peripheral unit operating in an eight bit mode in accordance with the principles of this invention.

DETAILED DESCRIPTION

Figure 1:
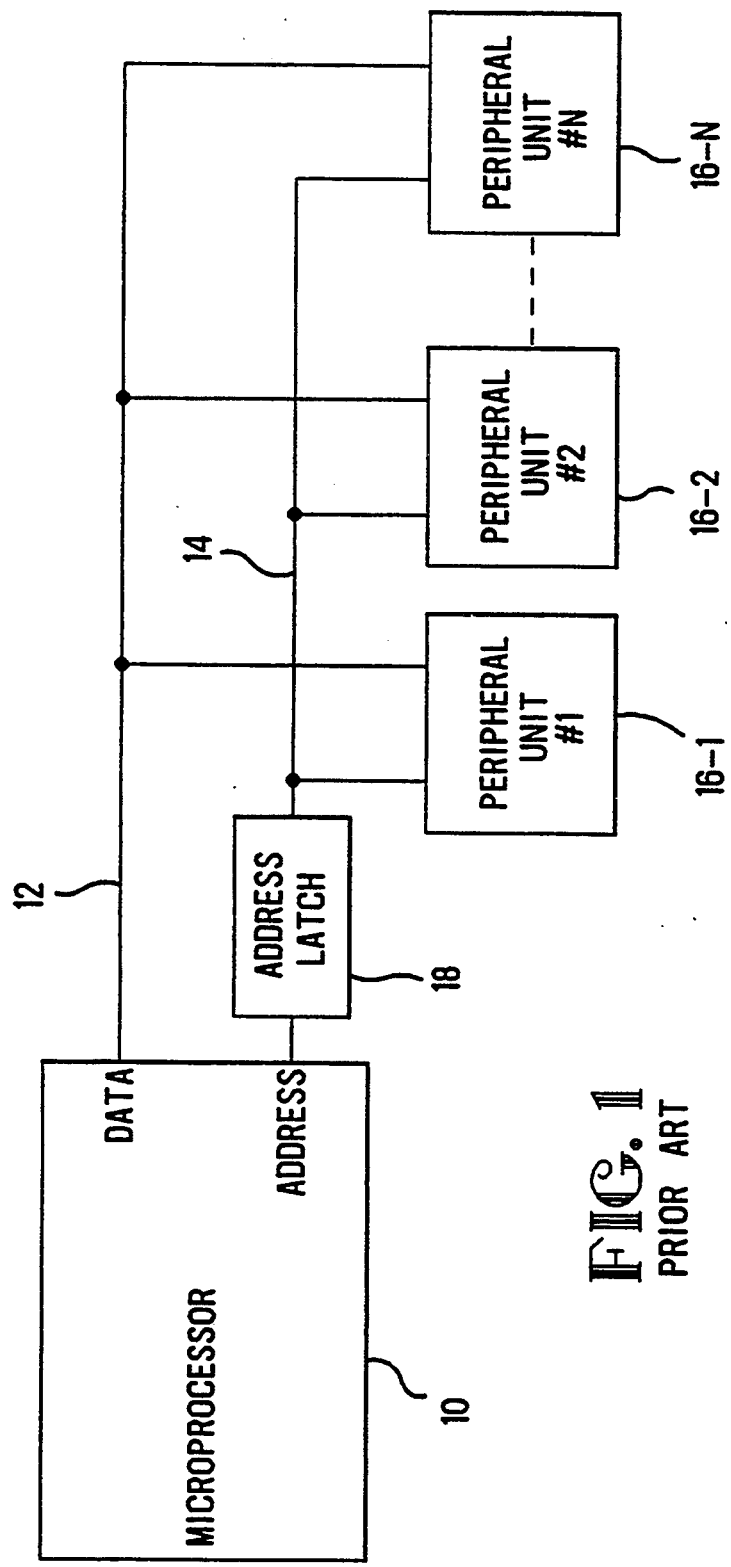
FIG. 1 is a block diagram showing how it is conventional in the prior art to connect a microprocessor with a plurality of peripheral units.
Figure 3A:
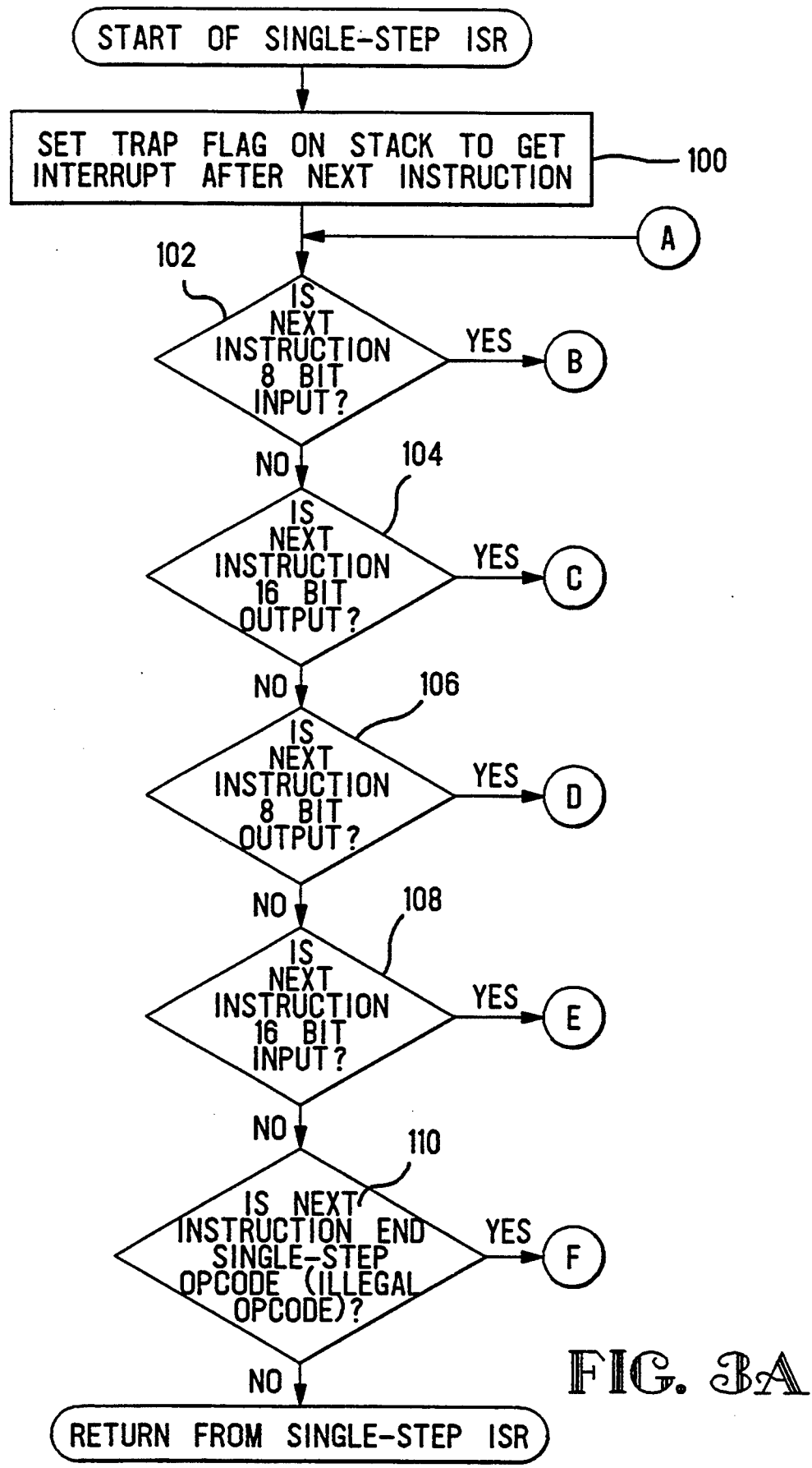
FIGS. 3A–3F, when taken together, constitute a flow chart of a software subroutine for operating the microprocessor of FIG. 2 in accordance with this invention.
Figure 3B:
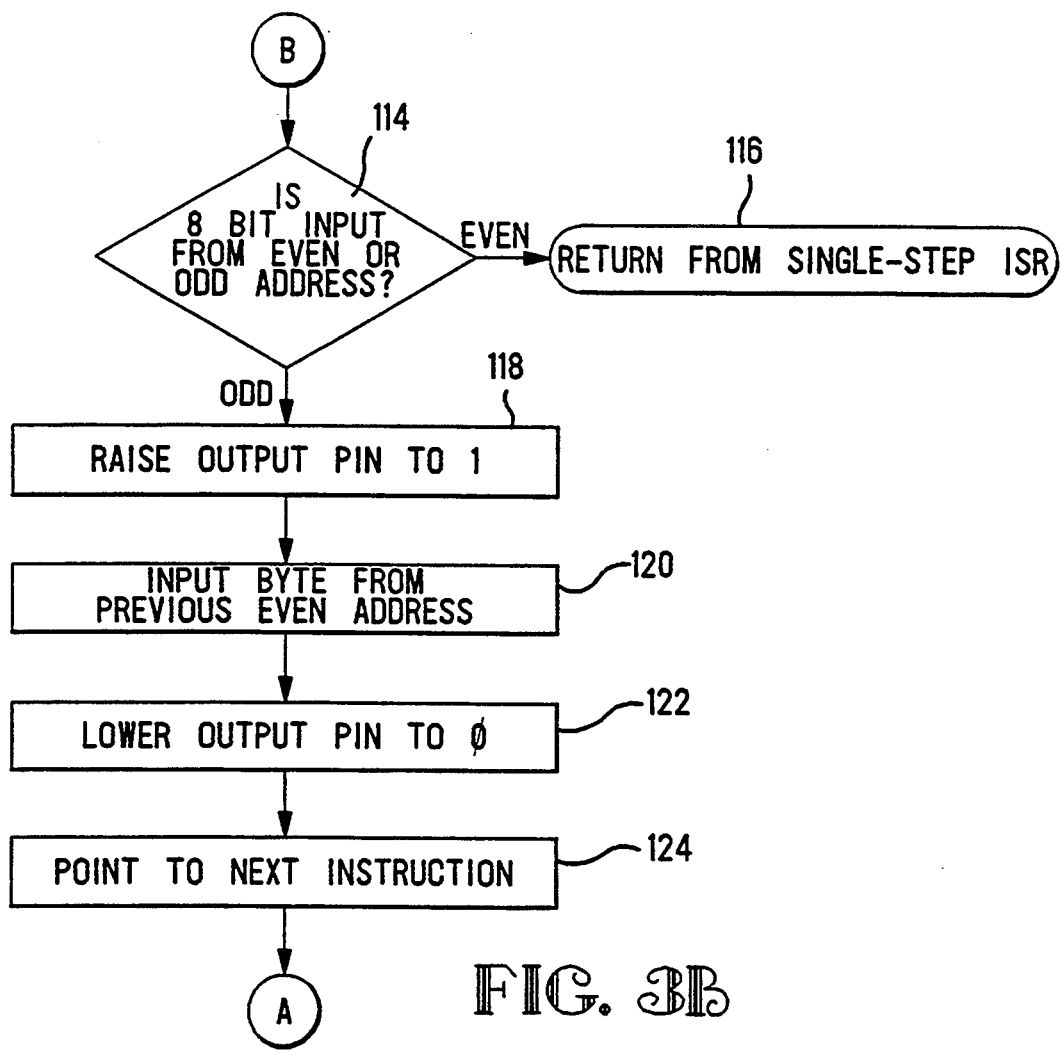
Figure 3F:
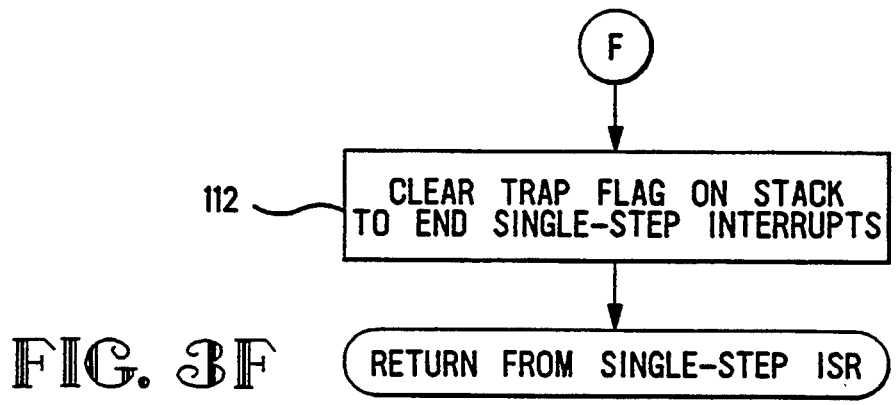
Figure 3C:
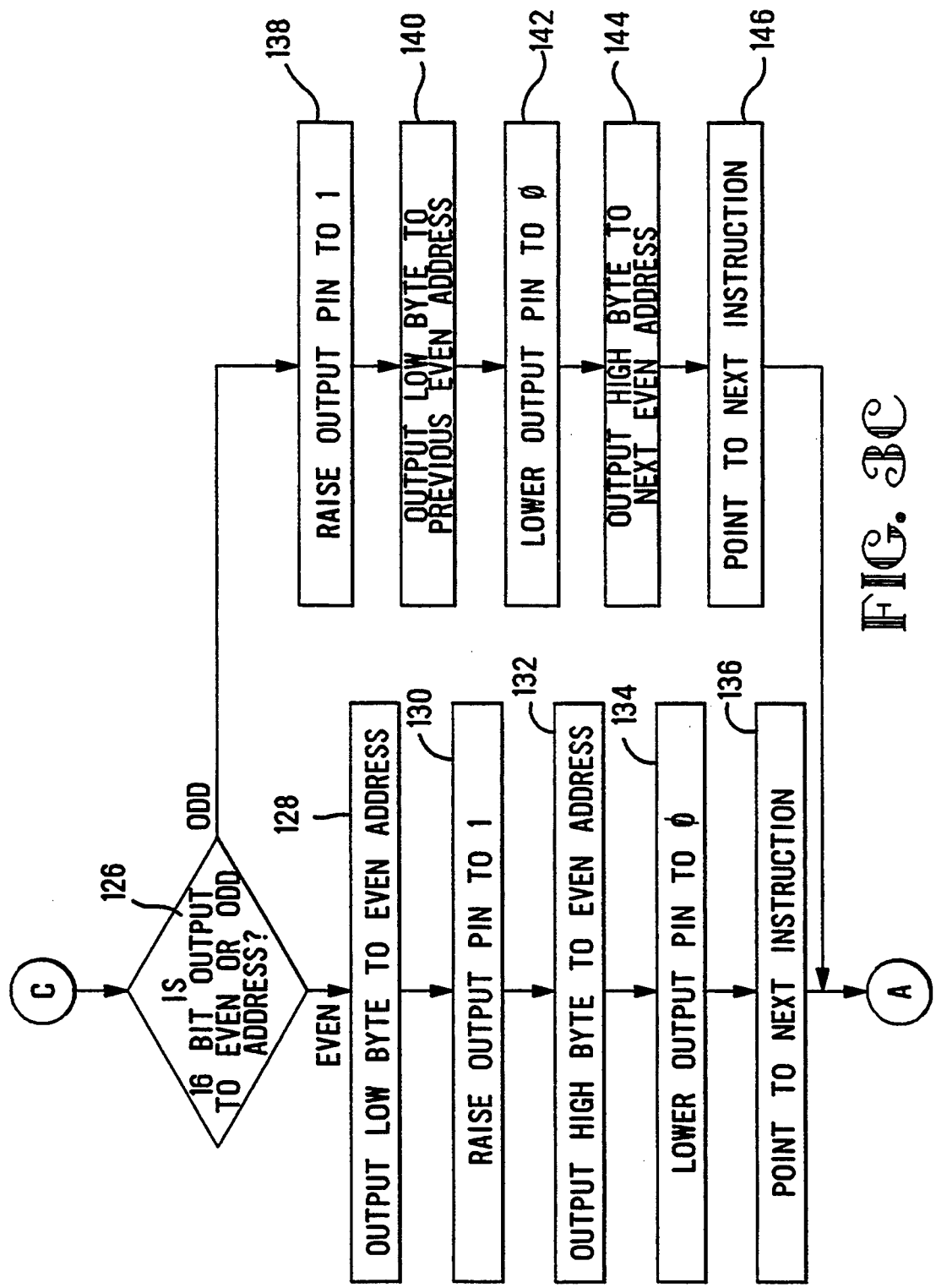
Figure 3D:
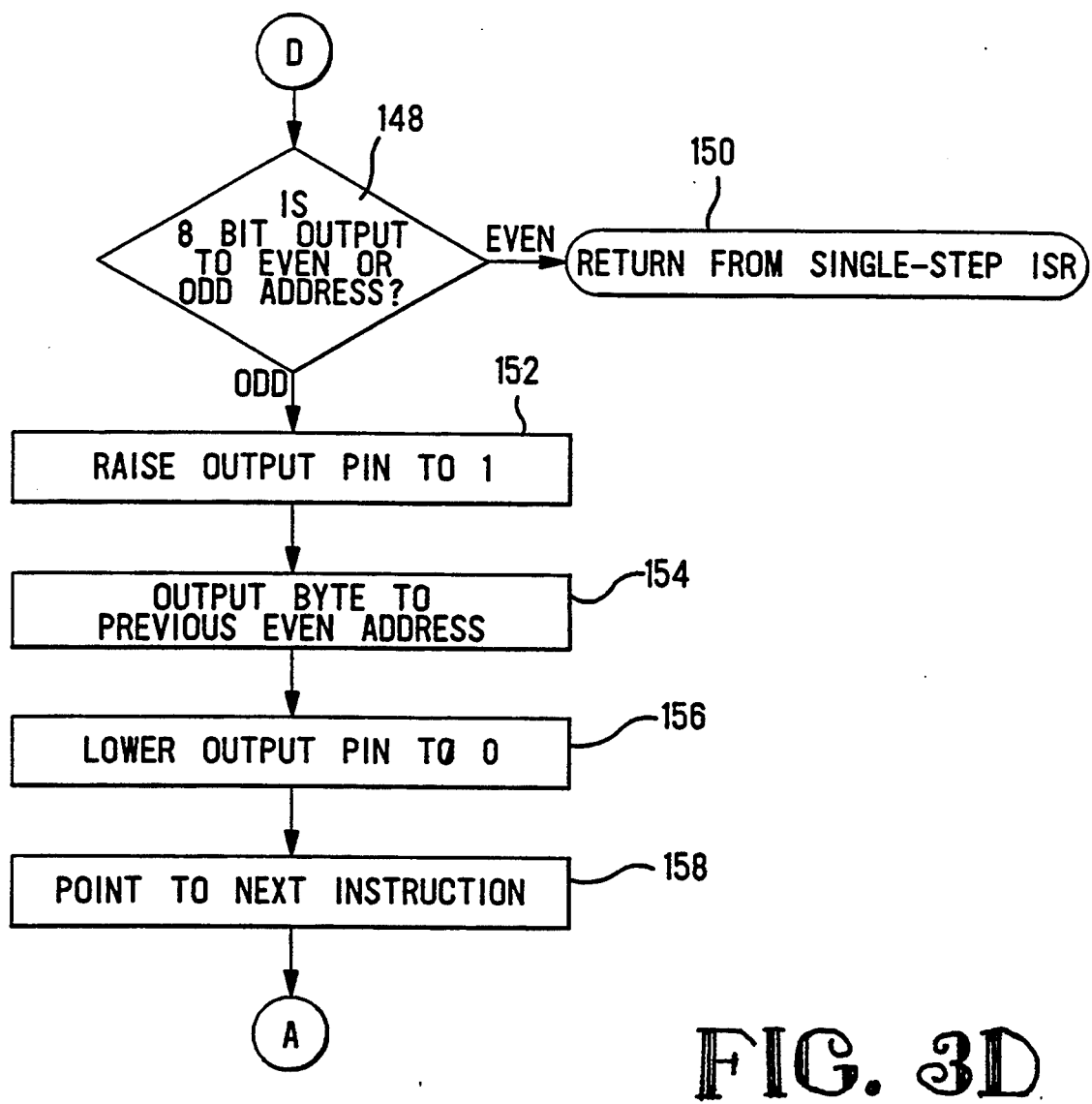
Figure 3E:
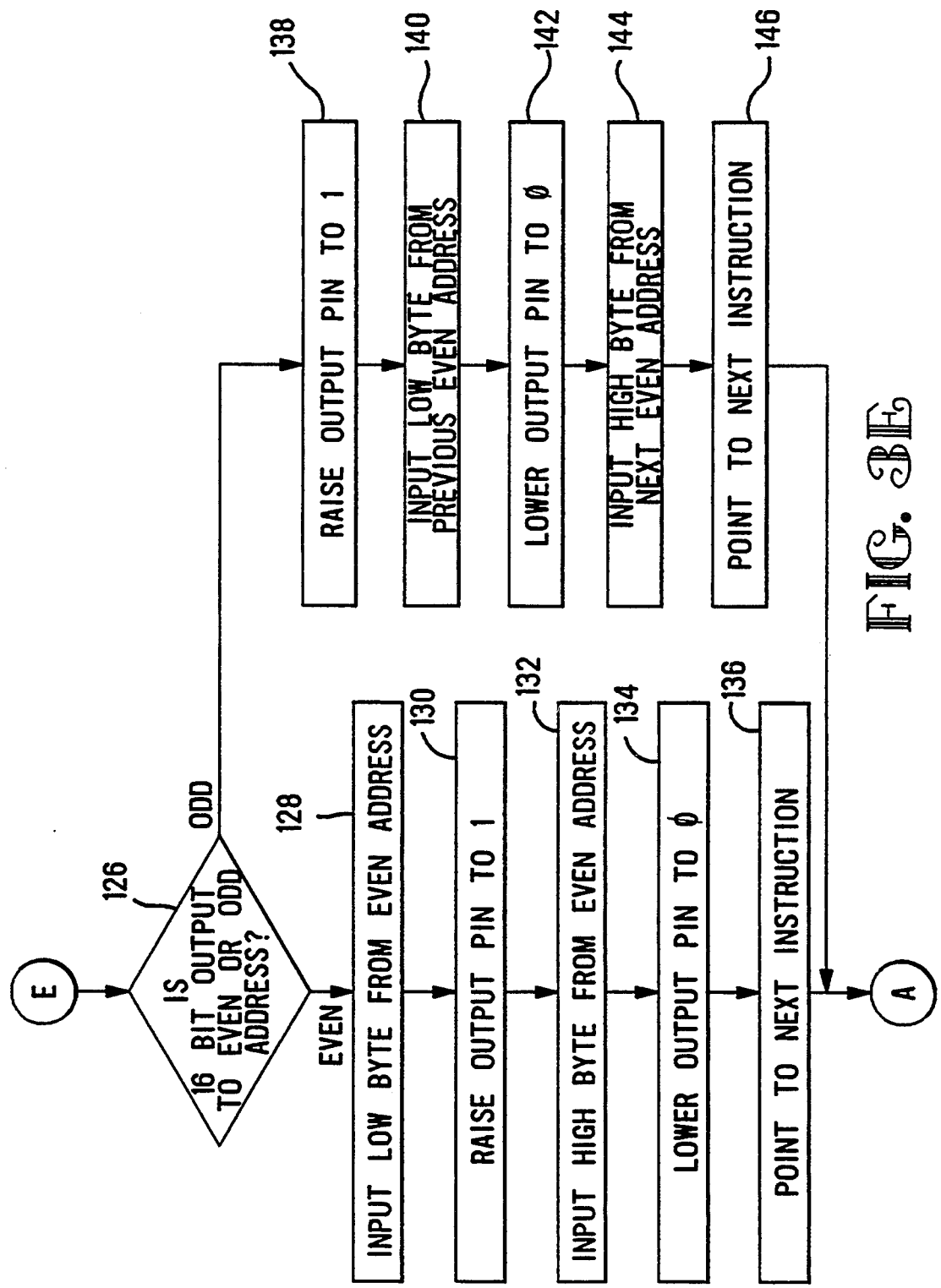

Referring now to the drawings, FIG. 1 illustrates a microprocessor 10 connected via a data bus 12 and an address bus 14 to a plurality of peripheral units 16-1, 16-2, ..., 16-N. The address bus 14 is provided with the output of an address latch 18 which receives address information from the microprocessor 10. Depending upon the address provided by the microprocessor 10 to the address latch 18, data is transferred via the data bus 12 between the microprocessor 10 and an appropriate one of the peripheral units 16-1, 16-2, ... 16-N, as is well known in the prior art. The problem addressed by the present invention arises when the microprocessor 10 and the data bus 12 are sixteen bit devices, whereas a particular one of the peripheral units 16-1, 16-2, ..., 6-N is either an eight bit device or is operating in an eight bit mode. For example, a sixteen bit computer such as the IBM PC AT is capable of utilizing eight bit cards. Thus, if such a computer must communicate with a VGA (analog video) card across an IBM PC AT style expansion connector the problem can arise. Although some VGA cards are capable of performing sixteen bit input/output accesses, most do not power-up in the sixteen bit input/output mode. Accordingly, at least during initialization, they must be communicated with as though they were eight bit input/output cards.

FIG. 2 illustrates a sixteen bit microprocessor 20 communicating with a peripheral unit 22. The peripheral unit 22 may either be an eight bit peripheral unit or may be operating in an eight bit mode. As shown in FIG. 2, the data bus 24 is divided into a low eight bit byte portion 26 and a high eight bit byte portion 28. When the microprocessor 20 communicates with an eight bit peripheral unit, only the low eight bit byte portion 26 of the data bus 24 can be utilized, since an eight bit peripheral unit does not recognize the high byte portion 28 of the data bus 24. However, as described above, this means that the microprocessor can only utilize even addresses. According to this invention, there is provided an OR gate 30 having two inputs and an output. The first input of the OR gate 30 is connected to the least significant bit (LSB) of the output of the address latch 32. The second input of the OR gate 30 is connected to an output pin 34 of the microprocessor 20. The output of the OR gate 30 is connected to the least significant bit (LSB) of the address input of the peripheral unit 22. The remaining address bit outputs from the address latch 32 are connected directly to respective address inputs of the peripheral unit 20. The microprocessor 20 is provided with internal subroutines for simulating the operation of byte-swap hardware to apply appropriate addresses to the address latch 32 and provide appropriate signals to the output pin 34, as will be discussed in full detail hereinafter. Thus, the only additional hardware required in accordance with this invention is the OR gate 30.

The present invention utilizes the fact that the peripheral unit 22 only recognizes data appearing on the low byte portion 26 of the data bus 24 and therefore the microprocessor 20 can only utilize even addresses for such data even though the peripheral unit 22 may require an odd address. Therefore, the OR gate 30, in conjunction with the output pin 34, is utilized to provide such odd address to the peripheral unit 22 at the same time that the microprocessor 20 is utilizing an even address. In other words, the output pin 34 is used by the microprocessor 20 to signal the peripheral unit 22 that the real address is odd, although the microprocessor 20 is acting as if the address is even so that it can transfer data over the low byte portion 26 of the data bus 24.

FIGS. 3A–3F, when taken together, form a flow chart of a subroutine for operating the microprocessor 20 in accordance with the principles of this invention. This subroutine uses the "single step interrupt" service routine which is normally used in debugging to allow the microprocessor to take control after each instruction so that the status of registers, etc., can be examined. The single step interrupt service routine is not normally used as part of an operating program. However, by using the single step interrupt service routine when the microprocessor 20 is communicating with an eight bit peripheral unit 22, each instruction can be examined to determine whether byte-swapping is required. Thus, whenever there is a data transfer between the microprocessor 20 and the eight bit peripheral unit 22, the trap flag to activate the single step interrupt service routine is set, as indicated by the block 100. The microprocessor 20 then checks to see if the next instruction is an eight bit data input, as indicated by the block 102. If not, the microprocessor 20 checks to see if the next instruction is a sixteen bit data output, as indicated by the block 104. If not, the microprocessor 20 checks to see if the next instruction is an eight bit data output, as indicated by the block 106. If not, the microprocessor 20 checks to see if the next instruction is a sixteen bit data input, as indicated by the block 108. If not, this means that the instruction does not involve the transfer of data. The microprocessor 20 then checks to see whether the next instruction is an illegal op-code, as indicated by the block 110. If not, the microprocessor 20 leaves the interrupt and executes the instruction. If the instruction is an illegal op-code, the microprocessor 20 clears the trap flag, as indicated by the block 112 to end the single step interrupts. Thus, when the microprocessor 20 has completed a data transfer with the eight bit peripheral unit 22, the single step interrupt service routine is no longer needed until the next such data transfer.

Returning to the block 102, if the next instruction had been an eight bit data input, the microprocessor 20 determines whether such input is from an even or an odd address, as indicated by the block 114. It will be recalled that byte-swapping is only required in the case of data transfer with an odd address in the peripheral unit 22. Therefore, in the case of an eight bit data input from an even address, the subroutine is exited and the instruction is executed normally, as indicated by the block 116. If the eight bit data input is from an odd address, the microprocessor 20 raises the output pin 34 to a ONE, as indicated by the block 118, and inputs the data from the previous even address, as indicated by the block 120. In effect, the microprocessor 20 has fooled itself into thinking that the address is even so that the data is placed on the low byte portion 26 of the data bus, but by forcing the output pin 34 to a ONE, the correct address is transmitted to the peripheral unit 22. Next, the output pin 34 is lowered to a ZERO, as indicated by the block 122, and the microprocessor 20 points to the next instruction, as indicated by the block 124. The subroutine then continues by examining the next instruction.

If the next instruction is a sixteen bit data output, as indicated by the block 104, the microprocessor 20 determines whether such output is to an even or an odd address, as indicated by the block 126. If to an even address, the low byte is sent to the even address, as indicated by the block 128 and then the output pin 34 is raised to a ONE, as indicated by the block 130. The high byte is treated by the microprocessor 20 as being sent to the same even address, as indicated by the block 132, so that the microprocessor 20 places that byte on the low byte portion 26 of the data bus, but since the output pin 34 had been raised to a ONE, the correct odd address is transmitted to the peripheral unit 22. The output pin 34 is then lowered to a ZERO, as indicated by the block 134, and the microprocessor 20 then points to the next instruction, as indicated by the block 136. In the event the sixteen bit data output is to go to an odd address, the microprocessor 20 raises the output pin 34 to a ONE, as indicated by the block 138, and treats the low byte as being sent to the previous even address, as indicated by the block 140. However, since the output pin 134 has been raised to a ONE, the correct odd address is transmitted to the peripheral unit 22. Next, the microprocessor 20 lowers the output pin 34 to a ZERO, as indicated by the block 142, and sends the high byte of data to the next even address, as indicated by the block 144. The microprocessor 20 then points to the next instruction, as indicated by the block 146.

If the next instruction is an eight bit data output, as indicated by the block 106, the microprocessor 20 determines whether such data transfer is to an even or an odd address, as indicated by the block 148. If to an even address, this can be handled normally, since it will automatically be placed onto the low byte portion 26 of the data bus and the microprocessor 20 returns from the interrupt, as indicated by the block 150. If the output is to an odd address, the microprocessor 20 raises the output pin 34 to a ONE, as indicated by the block 152, and operates as if the data transfer is to the previous even address, as indicated by the block 154. Thus, the data is placed on the low byte portion 26 of the data bus as if it were to an even address but the proper odd address is transmitted to the peripheral unit 22., Next, the microprocessor 20 lowers the output pin 34 to a ZERO, as indicated by the block 156, and points to the next instruction, as indicated by the block 158.

If the next instruction is a sixteen bit data input, as indicated by the block 108, the microprocessor 20 determines whether such input is from an even or an odd address, as indicated by the block 160. If from an even address, the microprocessor 20 inputs the low byte from the even address, as indicated by the block 162, and then raises the output pin 34 to a ONE, as indicated by the block 164. The microprocessor 20 then operates as if the high byte is to be inputted from the same even address, as indicated by the block 166. However, since the output pin 34 is a ONE, the peripheral unit 22 is provided with the correct odd address for the high byte. Next, the microprocessor 20 lowers the output pin 3 to a ZERO, as indicated by the block 168, and points to the next instruction, as indicated by the block 170. In the event the sixteen bit data input is from an odd address, the microprocessor 20 first raises the output pin 34 to a ONE, as indicated by the block 172. The microprocessor 20 then operates as if the low byte is to be inputted from the previous even address, as indicated by the block 174, so that it is placed on the low byte portion 26 of the data bus. However, since the output pin 34 is a ONE, the peripheral unit 22 is provided with the correct odd address. Next, the microprocessor 20 lowers the output pin 34 to a ZERO, as indicated by the block 176, and inputs the high byte from the next even address, as indicated by the block 178. Finally, the microprocessor 20 points to the next instruction, as indicated by the block 180.

In summary, whenever an eight bit data byte is to be transferred between the microprocessor 20 and an odd address in the peripheral unit 22, the microprocessor 20 is controlled to operate as if the peripheral unit address is the previous even address while communicating the correct odd address to the peripheral unit. The use of the output pin 34 and the OR gate 30 makes this possible.

Accordingly, there has been disclosed a byte-swap arrangement for use to enable a sixteen bit microprocessor to communicate with a peripheral unit operating in an eight bit mode. It is understood that the above-described embodiment is merely illustrative of the application of the principles of this invention, and it is only intended that this invention be limited by the scope of the appended claims.

I claim:

1. A method of transferring data between a sixteen bit microprocessor and an address in an eight bit peripheral unit, wherein the microprocessor and the peripheral unit are connected via the low byte half of the microprocessor's sixteen bit data bus, comprising the steps of:
   examining each instruction in the microprocessor to determine if that instruction involves the transfer of data between the microprocessor and the peripheral unit;
   if a transfer of data is involved, determining whether the data comprise eight bits or sixteen bits;
   if the data to be transferred comprise eight bits, determining whether the address in the peripheral unit is odd or even;
   if the address in the peripheral unit for the eight bit data transfer is odd, controlling the microprocessor to operate as if the peripheral unit address is the previous even address while communicating the correct odd address to the peripheral unit;
   if the data to be transferred comprise sixteen bits, determining whether the address in the peripheral unit is odd or even;
   if the address in the peripheral unit for the sixteen bit data transfer is even, controlling the microprocessor to first transfer the low eight bit byte of the data between the microprocessor and the even address of the peripheral unit and to then transfer the high eight bit byte of the data by operating as if the peripheral unit address is the even address while communicating the next odd address to the peripheral unit; and
   if the address in the peripheral unit for the sixteen bit data transfer is odd, controlling the microprocessor to first transfer the low eight bit byte of the data by operating as if the peripheral unit address is the previous even address while communicating the correct odd address to the peripheral unit and to then transfer the high eight bit byte of the data between the microprocessor and the next even address of the peripheral unit.

2. The method according to claim 1 further including the steps of:
   providing an OR gate having two inputs and an output;
   connecting the output of the OR gate to the least significant digit of the address input to the peripheral unit;
   connecting a first input of the OR gate to the least significant digit of the address bus between the microprocessor and the peripheral unit;
   connecting the second input of the OR gate to an output pin of the microprocessor; and
   controlling the microprocessor to place a high signal on the output pin whenever the microprocessor is operating as if the peripheral unit address is an even address while communicating an odd address to the peripheral unit.

3. The method according to claim 1 wherein the step of examining comprises the step of utilizing the single step interrupt service routine of the microprocessor.

4. An arrangement for transferring data between a sixteen bit microprocessor and an eight bit peripheral unit, wherein the microprocessor includes a sixteen bit data bus having a low eight bit byte portion and a high eight bit byte portion, the microprocessor being arranged to transmit and receive data over the data bus, an eight bit byte of data associated with an even address in a sixteen bit peripheral unit being transmitted over the low eight bit byte portion of the data bus and an eight bit byte of data associated with an odd address in the sixteen bit peripheral unit being transmitted over the high eight bit byte portion of the data bus, the eight bit peripheral unit being coupled to the low eight bit byte portion of the data bus of the microprocessor, the arrangement comprising:
   an address bus coupled between the microprocessor and the eight bit peripheral unit;
   an OR gate having an output and two inputs, the OR gate output being connected to the least significant digit of the address input to the eight bit peripheral unit, the first OR gate input being connected to the least significant digit of the address bus, and the second OR gate input being connected to an output pin of the microprocessor; and means responsive to the transfer of an eight bit data byte between the microprocessor and an odd address in the eight bit peripheral unit for controlling the microprocessor to operate as if the eight bit peripheral unit address is the even address immediately preceding said odd address and for placing a high signal on the microprocessor output pin.

5. The arrangement according to claim 4 further comprising:

means responsive to the transfer of sixteen data bits between the microprocessor and an even address in the eight bit peripheral unit for controlling the microprocessor to first transfer the low eight bit byte of the data between the microprocessor and the even address in the eight bit peripheral unit and for then controlling the microprocessor to transfer the high eight bit byte of the data by operating as if the eight bit peripheral unit address is the even address and at the same time placing a high signal on the microprocessor output pin; and means responsive to the transfer of sixteen data bits between the microprocessor and an odd address in the eight bit peripheral unit for controlling the microprocessor to first transfer the low eight bit byte of the data by operating as if the eight bit peripheral unit address is the previous even address and at the same time placing a high signal on the microprocessor output pin, and for then controlling the microprocessor to transfer the high eight bit byte of the data between the microprocessor and the next even address of the eight bit peripheral unit.

* * * * *